United States Patent [19]

Nakamura et al.

[11] 4,322,662
[45] Mar. 30, 1982

[54] APPARATUS FOR CONTROLLING THE ELECTRON BEAM IN AN IMAGE PICK-UP TUBE

[75] Inventors: Takashi Nakamura; Yoshio Chiba, both of Atsugi, Japan

[73] Assignee: Sony Corporation, Tokyo, Japan

[21] Appl. No.: 111,189

[22] Filed: Jan. 11, 1980

[30] Foreign Application Priority Data

Jan. 17, 1979 [JP] Japan .................................. 54-4297

[51] Int. Cl.³ .................................................. H01J 29/52
[52] U.S. Cl. ........................................ 315/383; 358/219
[58] Field of Search ........................ 315/10, 11, 383; 358/219

[56] References Cited

U.S. PATENT DOCUMENTS 3,417,199 10/1964 Yoshida et al. .......................... 315/14
3,619,717 3/1970 Lee ............................................ 315/383
3,975,657 8/1976 Sato et al. ................................. 315/10

*Primary Examiner*—Theodore M. Blum

*Attorney, Agent, or Firm*—Lewis H. Eslinger; Alvin Sinderbrand

[57] ABSTRACT

In an image pick-up tube of the type having a cathode electrode which emits a scanning electron beam, a control electrode which regulates the current of the electron beam at the cathode electrode and through which there is a control electrode current flow during operation of the tube, and a target electrode from which a video output current signal is obtained in correspondence to incident light from an object image projected on the target electrode as the latter is scanned by the electron beam, apparatus for controlling the electron beam in the image pick-up tube includes a resistive circuit for generating a beam control voltage signal from the video output current signal, a circuit for supplying the beam control voltage signal to the control electrode for regulating the current of the electron beam at the cathode electrode, and a resistive element responsive to the control electrode current for imparting a non-linear characteristic to the beam control voltage signal for varying levels of the incident light to increase the stable operating range of the pick-up tube.

10 Claims, 10 Drawing Figures

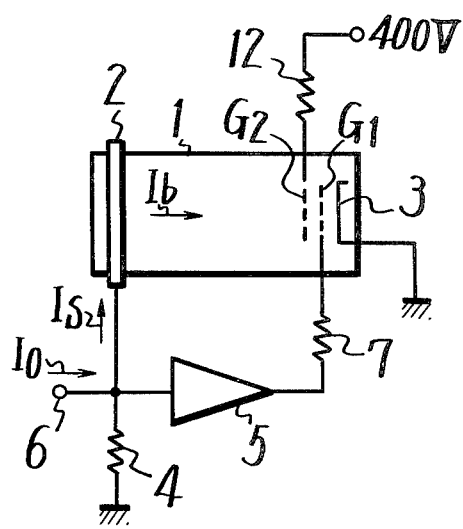
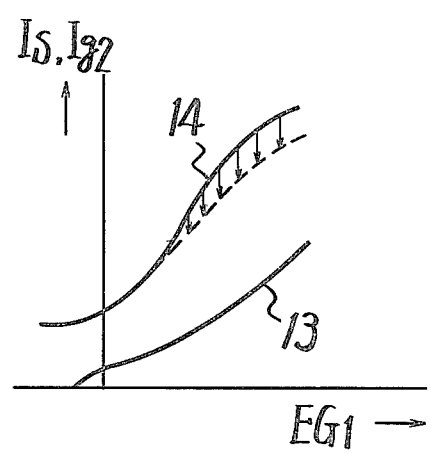
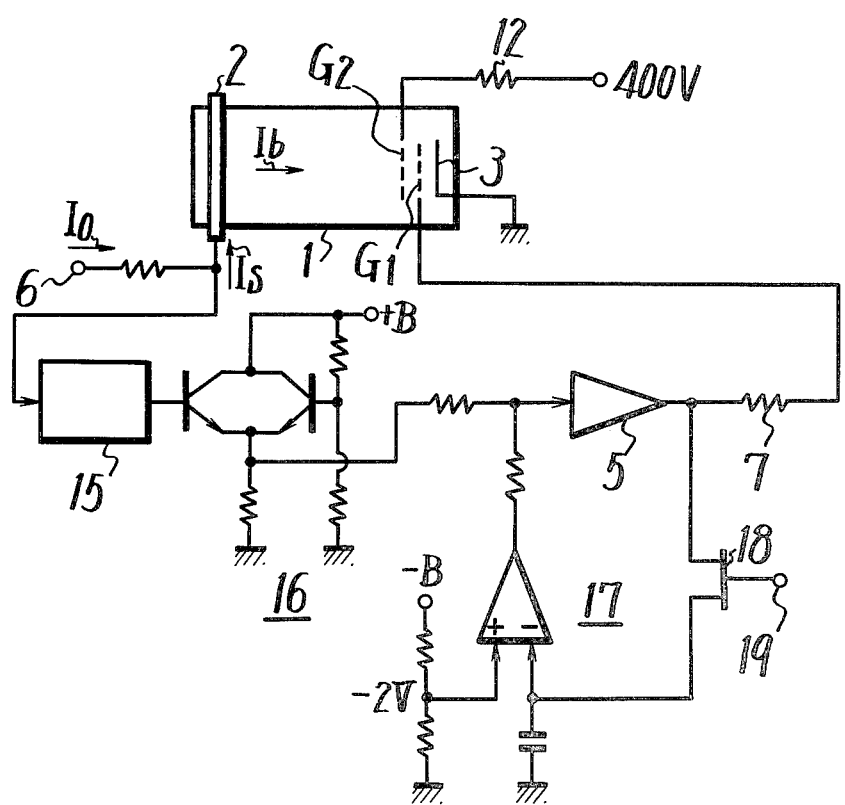

APPARATUS FOR CONTROLLING THE ELECTRON BEAM IN AN IMAGE PICK-UP TUBE

BACKGROUND OF THE INVENTION

1. Field of the Invention

This invention relates to an apparatus for controlling the electron beam in an image pick-up tube and, more particularly, is directed to an apparatus for controlling the electron beam in an image pick-up tube of the type using a feedback system to control the current level of the electron beam.

2. Description of the Prior Art

Generally, in a photoconduction-type image pick-up tube, such as a vidicon, a cathode electrode emits an electron beam of substantially constant current which is directed towards a target electrode having a photoconversion layer deposited thereon. The electron beam from the cathode electrode is regulated by a first beam control or beam-forming electrode which sharpens the electron beam, while a second accelerating electrode further sharpens the electron beam and accelerates the beam towards the target cathode. The electron beam from the cathode electrode then scans the target electrode and, depending on the amount of incident light from an object image projected on the target electrode, a video output signal is produced. More particularly, as the electrons from the accelerated beam impinge upon the target electrode, some are absorbed thereby to neutralize positive charges that reside there due to incident light from the object image projected on the target electrode. The varying amounts of electron-absorption produce an output current of corresponding intensity.

However, when the amount of light incident on the image pick-up tube increases, the constant current electron beam may not have sufficient charge to neutralize all of the positive charge stored at the various portions of the target electrode with one scanning of the electron beam. In other words, an electron beam shortage occurs. As a result, because the electron beam cannot neutralize all of the charge on the target electrode, the video output signal does not precisely follow increases in the amount of incident light projected on the target electrode. As the incident light increases, the video output signal produced by the target electrode decreasingly reflects the actual image viewed by the pick-up tube. Further, for object images having a very high white level, because all of the charge on the target electrode is not neutralized, a white after-image results when the pick-up tube or television camera moves to view another object image.

If, in order to compensate for the foregoing problem, the current of the electron beam at the cathode electrode is pre-set to a relatively large value to avoid insufficient beam current for high levels of incident light, the focusing state of the electron beam deteriorates, resulting in poor resolution of the object image to be viewed. This is because the focusing state of the electron beam deteriorates with increasing current levels of the beam.

It has therefore been desirable to control the current level of the electron beam in accordance with varying levels of incident light projected on the target electrode. In one device known in the art, a voltage corresponding to the video output signal is applied to the beam control electrode of the image pick-up tube to increase the current level of the electron beam for higher levels of incident light projected on the target electrode. In other words, the current of the electron beam is increased for higher levels of incident light without any corresponding deterioration in resolution. However, it has been found that, in such apparatus, when the voltage applied to the beam control electrode is of a low value, the video output signal is indistinguishable for varying levels of incident light projected on the target electrode. Further, it has been found that the stability of this system is poor, that is, the range within which the current level of the electron beam can be stably controlled is very narrow, and unwanted oscillation results.

OBJECTS AND SUMMARY OF THE INVENTION

Accordingly, it is an object of this invention to provide improved apparatus for controlling the electron beam in an image pick-up tube that avoids the above-described difficulties encountered with the prior art.

More particularly, it is an object of this invention to provide an apparatus for controlling the electron beam in an image pick-up tube in which an optimum electron beam current is supplied to the target electrode of the image pick-up tube in accordance with varying levels of incident light from an object image projected on the target electrode.

Another object of this invention is to provide an apparatus for controlling the electron beam in an image pick-up tube in which the range of stability for varying current levels of the electron beam is greatly increased.

Still another object of this invention is to provide apparatus for controlling the electron beam in an image pick-up tube in which the current level of the scanning electron beam is controlled by a control electrode voltage which corresponds to the video output signal and which is compensated, in a non-linear manner, for higher levels of incident light.

Yet another object of this invention is to provide apparatus for controlling the electron beam in an image pick-up tube in which the current flow through the beam control electrode, under normal operating conditions, is utilized to compensate the voltage applied to the beam control electrode of the image pick-up tube.

In accordance with an aspect of this invention, apparatus is provided for controlling the electron beam in an image pick-up tube of the type having a cathode electrode for emitting a scanning electron beam, a control electrode for regulating the current of the beam at the cathode electrode and through which there is a control electrode current flow during operation of the tube, and a target electrode from which a video output signal is obtained in correspondence to incident light from an object image projected on the target electrode as the latter is scanned by the electron beam, such apparatus including means for generating a beam control signal in response to the video output signal, means for supplying the beam control signal to the control electrode for regulating the current of the beam at the cathode electrode, and means for compensating the beam control signal for varying levels of the incident light in response to the control electrode current.

The above, and other, objects, features and advantages of the invention, will be apparent in the following detailed description of illustrative embodiments of the invention which is to be read in connection with the accompanying drawings.

BRIEF DESCRIPTION OF THE DRAWINGS

FIG. 8 is a schematic diagram of an image pick-up tube and a second embodiment of an apparatus according to this invention for controlling the electron beam in the image pick-up tube;

FIG. 9 is a graphical diagram illustrating the relationship between the video output signal, accelerating electrode current and control electrode voltage for the embodiment of FIG. 8; and FIG. 10 is a schematic diagram of an image pick-up tube and a third embodiment of an apparatus according to this invention for controlling the electron beam in the image pick-up tube.

DETAILED DESCRIPTION OF THE PREFERRED EMBODIMENTS

Figure 2:
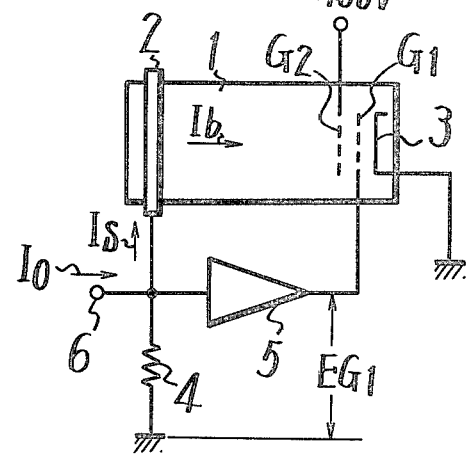
FIG. 2 is a schematic diagram of a known image pick-up tube utilizing a beam control electrode feedback circuit.

Referring to the drawings in detail, and initially to FIG. 2 thereof, it will be seen that, in a known image pick-up tube of the type of which this invention may be readily applied, an image pick-up tube 1 is provided with a target electrode 2 which may be comprised of, for example, a photoconversion layer deposited on a charged signal plate (not shown). The photoconversion layer may consist of a mosaic of elements which are nonconductive in the dark but become electrically conductive when illuminated, the extent of conductivity depending upon the intensity of illumination. Thus, an incident light from an object image falls on target electrode 2, the illuminated elements become more conductive and experience a change in voltage. Since the signal plate is positively charged, a charge pattern develops on the signal plate which electrically duplicates the light image.

Image pick-up tube 1 is further shown to include a cathode electrode 3 which emits an electron beam which is focused by a beam control electrode $G_1$ and accelerated by an accelerating electrode $G_2$ towards target electrode 2 for scanning the same. Scanning is accomplished by external deflection coils (not shown). As the electrons from the beam reach target electrode 2, some are absorbed to neutralize the positive charges that reside there due to the image, and excess electrons are discarded. The varying amounts of electron-absorption cause target electrode 2 to produce an output current $I_S$ (video output signal) of corresponding intensity across a load resistor 4. The voltage drop across this resistor then serves as the camera output voltage which is transferred to succeeding video amplifiers.

However, as previously discussed, when the current level of the electron beam is of a low value, there will be insufficient neutralization of the positive charges on target electrode 2 for high levels of incident light with the result that output current $I_S$ will not satisfactorily reflect increases in the level of light intensity. In contrast, if the current level of the electron beam is pre-set to a relatively large value to avoid this problem, the electron beam reaching the photoconversion layer will not be able to properly focus thereon. One known apparatus which attempts to avoid this problem is shown in FIG. 2 and utilizes the output current $I_S$ to control the current level of the electron beam. A reference or standard bias current $I_O$ is supplied to an input terminal 6 and combined with output current $I_S$ to form an output control voltage across resistor 4. This control voltage is then supplied through a linear amplifier 5, which amplifiers the output control voltage and produces a control electrode voltage $EG_1$ (beam control signal) which is supplied to beam control electrode $G_1$ for controlling the current level of the electron beam. The current level of the electron beam emitted from cathode electrode 3 is therefore controlled by output current $I_S$ which corresponds to the level of incident light from the object image.

Figure 1:
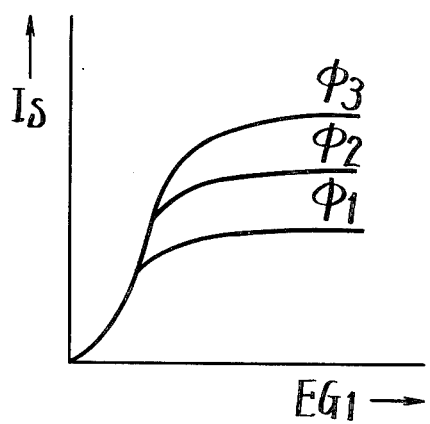
FIG. 1 is a graphical diagram illustrating the video output signal-control electrode voltage characteristic for the known pick-up tube of FIG. 2 for varying levels of light intensity.

However, when control electrode voltage $EG_1$ is of a low value, variations in output current $I_S$ are indistinguishable for varying levels $\phi_1$, $\phi_2$ and $\phi_3$ of incident light projected on target electrode 2, as shown in FIG. 1. In other words, the electron beam current is insufficient to neutralize all of the positive charges on target electrode 2 when electrode control voltage $EG_1$ is of a low value.

Further, it is generally known that, for the image pick-up tube of FIG. 2;

$$I_b = g_m \times EG_1 \tag{1}$$

$$EG_1 = (I_S + I_O) \times R_L \times A \tag{2}$$

where $I_b$ is the current of the electron beam, $EG_1$ is the control electrode voltage, $g_m$ is the mutual conductance between the electron beam current and the control electrode voltage, $I_S$ is the output current, $I_O$ is a reference current, $R_L$ is the resistance value of resistor 4, and $A$ is the gain of amplifier 5. If it is assumed that $I_b \cong I_S$, then it can be found from equations (1) and (2) that:

$$I_S = \frac{g_m \times R_L \times A}{1 - g_m \times R_L \times A} \times I_O \tag{3}$$

It is generally known that the denominator of equation (3) must be greater than zero, that is $1 - g_m \times R_L \times A > 0$, for the system to operate in a stable manner to prevent unwanted oscillation. However, with the known apparatus of FIG. 2, in order to satisfy the above condition, the range within which the current level of the electron beam can be stably controlled is very narrow, as will hereinafter be described.

Figure 7:
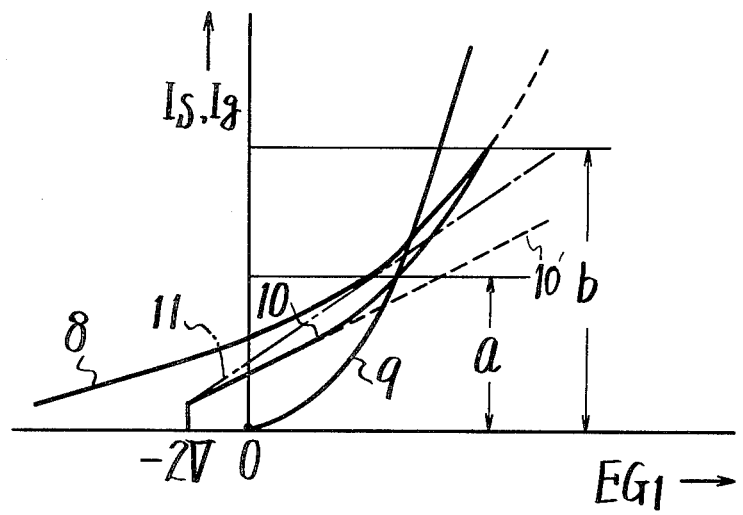
FIG. 7 is a graphical diagram illustrating the relationship between the video output signal, output control voltage, control electrode current and control electrode voltage for the image pick-up tube of FIG. 6.

Referring now to FIG. 7, curve 8 is a graphical representation of the output current $I_S$-control electrode voltage $EG_1$ characteristic and dashed-line curve 10′ is a graphical representation of the output control voltage-control electrode voltage $EG_1$ characteristic for the known embodiment of FIG. 2. As shown therein, the slope of straight line curve 10′ is of a relatively low value so as to expand the operating range of the system. However, because of the divergence between curves 8 and 10′, the system becomes unstable at higher levels of $EG_1$ when high levels of incident light are projected on target electrode 2, resulting in undesirable oscillation. To avoid this problem, it is necessary to increase the slope or gradient of control voltage curve 10′, as shown by one-dot chain line curve 11. However, by so increasing the slope of the control voltage curve, there results a consequent reduction in the operating range of the system such that the maximum electron beam current is limited to correspond to the intersection of curves 8 and 11, indicated by a in FIG. 7. It has therefore been desirable to increase the gradient of the control voltage curve while, at the same time, increasing the stable operating range of the system.

Figure 6:
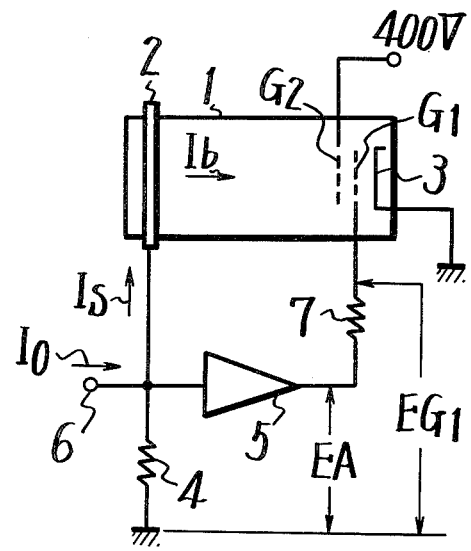
FIG. 6 is a schematic diagram of an image pick-up tube of the type shown on FIG. 2 together with a first embodiment of an apparatus according to this invention for controlling the electron beam in the image pick-up tube.

Referring now to FIG. 6, a first embodiment of an apparatus for controlling the electron beam in an image pick-up tube according to the present invention is shown, in which elements corresponding to those described above with reference to the apparatus of FIG. 2 are identified by the same reference numerals. As shown therein, a resistor 7 having a resistance value $R_{G1}$ is connected between the output of amplifier 5 and beam control electrode $G_1$ so as to provide a voltage drop which is dependent upon the resistance value $R_{G1}$ of resistor 7 and the current $I_g$ flowing through beam control electrode $G_1$. Thus, the control electrode voltage $EG_1$ that is supplied to beam control electrode $G_1$ is reduced by the voltage drop across resistor 7 so that $EG_1 = EA - I_g \times R_{G1}$, where EA is the amplified voltage from amplifier 5. Since the control electrode current $I_g$ through beam control electrode $G_1$ increases with higher levels of incident light projected on target electrode 2, resistor 7 consequently provides a larger voltage drop for such higher levels of incident light, causing a non-linear characteristic to be imparted to the control voltage curve, as indicated by curve 10 in FIG. 7. Therefore, the control electrode current $I_g$-control electrode voltage $EG_1$ characteristic is represented by non-linear curve 9 in FIG. 7 such that control electrode current $I_g$ rises at an increasing rate for increasing values of control electrode voltage $EG_1$. Since amplifier 5 produces an output voltage represented by control voltage curve 10′ in FIG. 7, an increasing voltage drop across resistor 7 will result for increasing values of control electrode voltage $EG_1$ such that the control voltage curve will now be represented by the non-linear solid line curve 10. The gradient of the control voltage curve is therefore shown to be increased only for large values of control electrode voltage $EG_1$. This curve and output current curve 8 also intersect at a level indicated by b so as to substantially increase the stable operating range of the system. Thus, the pick-up tube is now adapted to stably operate at higher levels of incident light and at higher current levels of the electron beam.

Accordingly, using the same analysis previously utilized with the apparatus of FIG. 6, the following equations are found:

$$EA - EG_1 = I_g \times R_{G1} \quad (4)$$

$$EA = (I_S + I_O) \times R_L \times A \quad (5)$$

$$I_b = g_m \times EG_1 \quad (6)$$

$$I_g = g_m' \times EG_1 \quad (7)$$

where $I_g$ is the current flowing through control electrode $G_1$ and $g_m'$ is the mutual conductance between the control electrode current $I_g$ and control electrode voltage $EG_1$. Again, assuming that $I_b \cong I_S$, equations (4)–(7) can be combined as follows:

$$I_S = \frac{g_m \times R_L \times A}{1 + g_m' \times R_{G1} - g_m \times R_L \times A} \times I_O \quad (8)$$

Since the operating range of the pick-up tube is determined by the denominator of equation (8), the addition of resistor 7 is seen to increase the operating range of the pick-up tube by a value $g_m' \times R_{G1}$ over that of the embodiment of FIG. 2. Thus, even if the apparatus is initially set to operate in accordance with the characteristic shown by curve 10′, this curve can be modified by the inclusion of resistor 7 so as to conform to the characteristic shown in curve 10 and increase the range in which the maximum electron beam current will stably operate, as indicated by b in FIG. 7.

Figure 3:
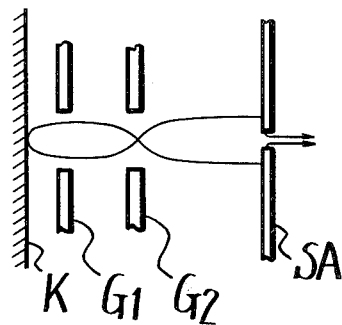
FIG. 3 is a schematic diagram of a known electron gun structure for an image pick-up tube.
Figure 4:
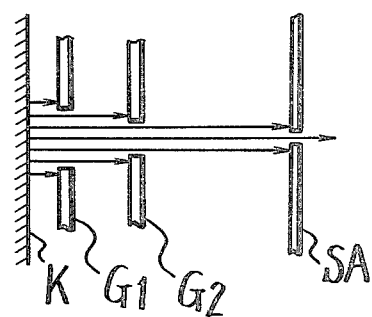
FIG. 4 is a schematic diagram of a known electron gun structure of the laminar flow type for an image pick-up tube.
Figure 5:
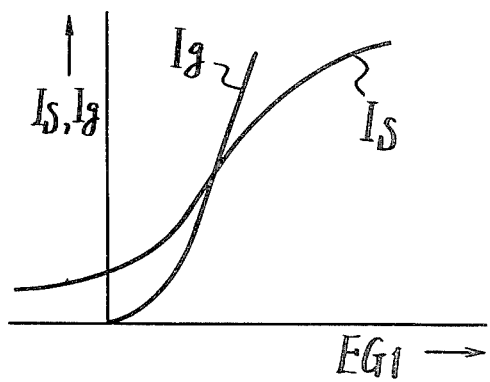
FIG. 5 is a graphical diagram illustrating the video output signal, control electrode current and control electrode voltage characteristics for the known pick-up tube of FIG. 2 utilizing an electron gun structure of the laminar flow type.

It is to be noted that the present invention is preferably utilized with an image pick-up tube having an electron gun structure of the laminar flow type. In this connection, reference to FIG. 3 will show that a known electron gun structure which is not of the laminar flow type has a cathode electrode K emitting an electron beam towards a small aperture plate SA and a beam control electrode $G_1$ is heavily biased to cause the electron beam to cross over. However, with this type of electron gun structure, no current flows through beam control electrode $G_1$ under normal operating conditions. Accordingly, resistor 7 would have no effect in such apparatus. In comparison, an electron gun structure of the laminar flow type is shown in FIG. 4, in which the electron beam flows in layer form. In this electron gun structure, control electrode $G_1$ is supplied with a positive bias voltage in the normal operating mode to produce a current flow through beam control electrode $G_1$. Thus, it is readily seen that an electron gun structure of the laminar flow type should preferably be utilized with an image pick-up tube according to the present invention. Referring now to FIG. 5 which is a graphical representation of various characteristics of an image pick-up tube utilizing an electron gun structure of the laminar flow type, it is shown that a current $I_g$ flows through beam control electrode $G_1$ during normal operating conditions. It is this current $I_g$ flowing through beam control electrode $G_1$ that is utilized to expand the stable operating range for the current level of the electron beam.

Referring now to FIG. 8, it will be seen that, in another embodiment of the invention for controlling the electron beam in an image pick-up tube, elements corresonding to those described above with reference to the apparatus of FIG. 6 are identified by the same reference numerals. The apparatus of FIG. 8 utilizes the principle that the value of the mutual conductance $g_m$ changes in accordance with respective changes in the voltage applied to accelerating electrode $G_2$. Thus, a further resistor 12 having a resistance value $R_{G2}$ is connected in series between accelerating electrode $G_2$ and a reference voltage source, shown in FIG. 8 as providing a voltage of 400 V. In this manner, as the level of the accelerating electrode current $I_{g2}$ supplied to accelerating electrode $G_2$ increases, as indicated by curve 13 in FIG. 9, the voltage supplied to accelerating electrode $G_2$ decreases due to the voltage drop across resistor 12. As a result, the electron beam from cathode 3 impinges upon target 2 with less force, resulting in a decrease in the neutralization of the charges on target plate 2 for high levels of incident light. Consequently, output current $I_S$ decreases at such high levels of incident light, that is, the slope of the output current $I_S$-control electrode voltage $EG_1$ characteristic decreases at high levels of incident light, as shown by curve 14 in FIG. 9. Since the output control voltage across resistor 4 changes in accordance with changes in output current $I_S$, the slope or gradient of the control voltage curve (curve 10 in FIG. 7), and consequently, the control electrode current curve 9, also decreases at such high levels of incident light. This means that the non-linear characteristic imparted to curve 10' by resistor 7 is not as great in the case where resistor 12 is utilized with accelerating electrode $G_2$. It is only at much higher levels of incident light that the non-linear characteristic imparted by resistor 7 obtains its full effect, resulting in curves 8 and 10 intersecting at a higher value of $EG_1$. It is thus seen that the electron beam can be stably operated within a larger operating range.

Referring back to the known pick-up tube of FIG. 2, if the gain of amplifier 5 is of a low value, the current level of the electron beam is consequently of a low value and is insufficient to neutralize all of the charge on target electrode 2. In other words, when the gain of amplifier 5 is of a low value, the mutual conductance $g_m$ is also of a low value. This results in a low current level for the electron beam, as determined by equation (1). If, in order to avoid this problem, the gain of amplifier 5 is increased, the mutual conductance $g_m$ also increases, causing the system to oscillate at high levels of incident light. It is therefore desirable to initiate the beam control feedback system only at such high levels of incident light, and to otherwise maintain the gain of amplifier 5 at a low value. However, when the level of incident light is of a low value, the feedback system is disconnected and a separate beam control operation is utilized, as will hereinafter be described.

Referring now to FIG. 10, it will be seen that, in still another embodiment of the invention for controlling the electron beam in an image pick-up tube, elements corresponding to those described above with reference to the apparatus of FIG. 8 are identified by the same reference numerals. In the apparatus of FIG. 10, output current $I_S$ is combined with reference current $I_O$, the latter being supplied through a resistor. The combined current is then used to generate an output control voltage through a suitable resistor (not shown). The output control voltage is then supplied through an amplifier 15 to a clipping circuit 16 which clips or blocks only that part of the signal lower than a predetermined level which corresponds to a predetermined high level of incident light projected on target electrode 2. When incident light having a level of intensity greater than the predetermined high level is projected on target electrode 2, clipping circuit 16 transmits only that portion of the signal above the predetermined level, through amplifier 5 and resistor 7, to beam control electrode $G_1$, as previously described. When the light incident on target electrode 2 is of a low value, such that the signal supplied to clipping circuit 16 is below the predetermined level, no signal is transmitted through clipping circuit 16 to amplifier 5. However, in such a case, in order to insure a sufficient electron beam current, a clamping circuit 17 is provided. As shown in FIG. 10, clamping circuit 17 includes a field effect transistor (FET) 18 for supplying a clamping pulse through an input terminal 19 thereof. Thus, clamping circuit 17 provides a base level voltage of approximately $-2$ volts to control electrode $G_1$, even when clipping circuit 16 does not transmit any signal to amplifier 5. In this manner, an electron beam flow from cathode 3 to target electrode 2 is insured at all times. Again, it is to be realized that, as shown in FIG. 10, a resistor 12 is preferably utilized with accelerating electrode $G_2$, as previously described in regard to the embodiment of FIG. 8.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

We claim:

1. Apparatus for controlling the electron beam in an image pick-up tube of the type having a cathode electrode for emitting a scanning electron beam, a control electrode for regulating the current of said beam at said cathode electrode and through which there is a control electrode current flow during operation of the tube, and a target electrode from which a video output signal is obtained in correspondence to incident light from an object image projected on said target electrode as the latter is scanned by said electron beam, said apparatus comprising:
   means for generating a beam control signal in response to said video output signal;
   means for supplying said beam control signal to said control electrode for regulating the current of said beam at said cathode electrode; and
   means for compensating said beam control signal for varying levels of said incident light in response to said control electrode current.

2. Apparatus according to claim 1; in which said means for compensating includes a resistive element for imparting a non-linear characteristic to said beam control signal to increase the stable operating range of the pick-up tube.

3. Apparatus according to claim 2; in which said resistive element is connected between said means for generating and said control electrode for providing a voltage drop thereacross which increases for increasing values of said control electrode current.

4. Apparatus according to claim 2; in which said pick-up tube further includes an accelerating electrode and said means for compensating further includes a second resistive element associated with said accelerating electrode for reducing the voltage supplied to said accelerating electrode to further increase the stable operating range of the pick-up tube.

5. Apparatus according to claim 1; in which said video output signal is an output current signal and said means for generating includes a resistive element for developing an output control voltage thereacross in response to said output current signal.

6. Apparatus according to claim 5; in which said means for generating includes an amplifier for amplifying said output control voltage to produce said beam control signal.

7. Apparatus according to claim 6; in which said means for generating further includes a clipping circuit receiving said output control voltage and supplying said amplifier only with that portion of said output control voltage over a predetermined level.

8. Apparatus according to claim 7; further including means for providing a second beam control signal to said beam control electrode for regulating the current of said beam at said cathode electrode when the level of said output control voltage is below said predetermined level.

9. Apparatus for controlling the electron beam in an image pick-up tube of the type having a cathode electrode for emitting a scanning electron beam, a control electrode for regulating the current of said beam at said cathode electrode and through which there is a control electrode current flow during operation of the tube, and a target electrode from which a video output signal is obtained in correspondence to incident light from an object image projected on said target electrode as the latter is scanned by said electron beam, said apparatus comprising:

means for generating a beam control signal in response to said video output signal;
means for supplying said beam control signal to said control electrode for regulating the current of said beam at said cathode electrode; and
means for varying said beam control signal in a non-linear manner as a function of said control electrode current for varying levels of said incident light.

10. Apparatus for controlling the electron beam in an image pick-up tube of the type having a cathode electrode for emitting a scanning electron beam, a control electrode for regulating the current of said beam at said cathode electrode and through which there is a control electrode current flow during operation of the tube, and a target electrode from which a video output signal is obtained in correspondence to incident light from an object image projected on said target electrode as the latter is scanned by said electron beam, said apparatus comprising:

means for generating a beam control signal in response to said video output signal;
means for supplying said beam control signal to said control electrode for regulating the current of said beam at said cathode electrode; and
means for decreasing the level of said beam control signal in a non-linear manner as a function of said control electrode current for varying levels of said incident light.

* * * * *